United States Patent [19]
Norris

[11] Patent Number: 6,105,007
[45] Date of Patent: *Aug. 15, 2000

[54] AUTOMATIC FINANCIAL ACCOUNT PROCESSING SYSTEM

[75] Inventor: Jeffrey A. Norris, Lexington, S.C.

[73] Assignee: Affinity Technology Group, Inc., Columbia, S.C.

[*] Notice: This patent is subject to a terminal disclaimer.

[21] Appl. No.: 09/305,622

[22] Filed: May 5, 1999

Related U.S. Application Data

[63] Continuation of application No. 08/732,584, Oct. 15, 1996, and a continuation of application No. 08/327,653, Oct. 24, 1994, abandoned, and a continuation-in-part of application No. 08/113,205, Aug. 27, 1993, abandoned.

[51] Int. Cl.⁷ ..................................................... G06F 17/60
[52] U.S. Cl. ............................... 705/38; 705/39; 705/42; 705/44; 705/35
[58] Field of Search .................................. 705/38, 39, 42, 705/44, 35; 395/238, 239, 237, 235, 236, 242, 243, 244

[56] References Cited

U.S. PATENT DOCUMENTS

Re. 32,985  7/1989  Nagata et al. ........................... 364/401
3,970,992  7/1976  Boothroyd et al. .

(List continued on next page.)

FOREIGN PATENT DOCUMENTS 5101250  4/1993  Japan .

OTHER PUBLICATIONS

Christy Tauher, "Commerce Branches Off into PC Banking", Bank Systems & Technology, May 1996.
"AT&T and Novell, Inc. Agreement to Offer New Public Backbone", Bank Systems & Technology, Jul. 1994.
"Interactive Banking Gets a Push Up North", Bank Systems & Technology, Mar. 1994.
Alan Radding, "A View of Technology in '92", Bank Management, v 68, n 1, pp. 28–35, Jan. 1992.
Bill Conroy, "Citicorp Test–Markets Device That Simplified Home Banking", The Business Journal—Phoenix, v 10, n 51, p. 16, Oct. 1990.
"Loans in an Hour for Busy Shoppers", Consumer Financial, v 154, n 243, p. 6, Dec. 1989.
Steven Wilmsen, "Home–Banking Service Adding Denver to Financial Network", Denver Post, v 97, n 309, sec C, p. 1, Jun. 8, 1989.
"Malone Introduces Innovative Banking Services", PC Newsletter, Jun. 8, 1989.

(List continued on next page.)

Primary Examiner—Eric W. Stamber
Assistant Examiner—Anne Teitelbaum
Attorney, Agent, or Firm—Rhodes & Mason, P.L.L.C.

[57] ABSTRACT

A method and apparatus for closed loop, automatic processing of typical financial transactions, including loans, setting up checking, savings and individual retirement accounts, obtaining cashier's checks, ordering additional checks, issuing credit and debit cards, wire transfering money, and so on. The transactions are provided from a kiosk and controlled by a computer controller interacting with the consumer. In the case of loans, a computer controller helps the consumer in the completion of the application, performs the underwriting, and transfers funds. The computer controller obtains the information needed to process the application, determines whether to approve the loan, effects electronic fund transfers to the applicant's deposit account and arranges for automatic withdrawals to repay the loan. The computer controller reviews documentation requirements including consumer lending and other required documentation with the consumer and obtains acknowledgment of acceptance of terms by having the consumer sign an electronic signature pad. Copies of documents with a digital photograph are printed out by a printer in the kiosk for the consumer. Finally, the kiosk has the capability of imprinting a credit or debit card in response to a consumer request.

44 Claims, 3 Drawing Sheets

U.S. PATENT DOCUMENTS

| | | | |
|---|---|---|---|
| 4,017,835 | 4/1977 | Randolph | 340/152 R |
| 4,491,725 | 1/1985 | Pritchard . | |
| 4,567,359 | 1/1986 | Lockwood | 235/381 |
| 4,598,367 | 7/1986 | DeFrancesco et al. . | |
| 4,600,828 | 7/1986 | Nogami et al. | 235/379 |
| 4,646,250 | 2/1987 | Childress . | |
| 4,648,037 | 3/1987 | Valentino | 364/408 |
| 4,649,832 | 3/1987 | Han et al. | 109/24.1 |
| 4,675,815 | 6/1987 | Kuroki et al. | 379/37 |
| 4,683,536 | 7/1987 | Yamamoto | 364/408 |
| 4,727,243 | 2/1988 | Savar | 235/379 |
| 4,730,252 | 3/1988 | Bradshaw . | |
| 4,736,294 | 4/1988 | Gill et al. | 364/408 |
| 4,794,530 | 12/1988 | Yukiura et al. | 364/407 |
| 4,799,156 | 1/1989 | Shavit et al. | 705/26 |
| 4,831,526 | 5/1989 | Luchs et al. | 705/4 |
| 4,876,648 | 10/1989 | Lloyd | 705/38 |
| 4,890,228 | 12/1989 | Longfield . | |
| 4,947,028 | 8/1990 | Gorog | 235/381 |
| 4,949,278 | 8/1990 | Davies et al. | 706/10 |
| 4,958,368 | 9/1990 | Parker | 379/91 |
| 4,965,821 | 10/1990 | Bishop et al. | 379/91 |
| 4,988,849 | 1/1991 | Sasaki et al. | 235/379 |
| 4,992,939 | 2/1991 | Tyler | 364/401 |
| 4,994,964 | 2/1991 | Wolfberg et al. | 705/36 |
| 5,023,904 | 6/1991 | Kaplan et al. | 379/91 |
| 5,025,138 | 6/1991 | Cuervo | 235/379 |
| 5,025,373 | 6/1991 | Keyser, Jr. et al. . | |
| 5,049,862 | 9/1991 | Dao et al. . | |
| 5,083,270 | 1/1992 | Gross et al. | 364/408 |
| 5,120,906 | 6/1992 | Protheroe et al. | 178/18.05 |
| 5,193,057 | 3/1993 | Longfield | 705/31 |
| 5,202,825 | 4/1993 | Miller et al. . | |
| 5,206,803 | 4/1993 | Vitagliano et al. | 364/408 |
| 5,218,539 | 6/1993 | Elphick et al. | 364/419 |
| 5,220,501 | 6/1993 | Lawlor et al. | 364/408 |
| 5,231,571 | 7/1993 | D'Agostino . | |
| 5,239,462 | 8/1993 | Jones et al. | 364/408 |
| 5,241,620 | 8/1993 | Ruggiero | 395/22 |
| 5,262,941 | 11/1993 | Saladin et al. | 705/38 |
| 5,274,547 | 12/1993 | Zoffel et al. | 364/408 |
| 5,297,202 | 3/1994 | Kapp et al. . | |
| 5,361,201 | 11/1994 | Jost et al. . | |
| 5,383,113 | 1/1995 | Kight et al. | 364/401 |
| 5,537,315 | 7/1996 | Mitcham | 705/4 |
| 5,559,895 | 9/1996 | Lee et al. . | |
| 5,576,951 | 11/1996 | Lockwood | 705/27 |
| 5,598,474 | 1/1997 | Johnson | 380/23 |
| 5,604,341 | 2/1997 | Grossie et al. | 235/379 |
| 5,611,052 | 3/1997 | Dykstra et al. | 395/238 |
| 5,732,397 | 3/1998 | DeTore et al. | 705/1 |
| 5,774,882 | 6/1998 | Keen et al. | 705/38 |
| 5,797,133 | 8/1998 | Jones et al. | 705/38 |
| 5,878,403 | 3/1999 | DeFrancesco et al. | 705/38 |
| 5,940,811 | 8/1999 | Norris | 705/38 |

OTHER PUBLICATIONS

Rothfeder, Jeffrey; "Electronic Bill–Paying for the Little Guy"; Business Week; Sep. 25, 1989,p. 206E.

"Electronic Network Will Link Dealers to Many Lenders; Goal is to Create a Form of EFT Transfer System", American Banker, Feb. 8, 1988, 06.1, vol. 153, No. 26.

Patrick Haverson, "A Man with Grand Visions", Banking Technology, pp. 30–32, May 1993.

Richard Read, "Crossing the Track to Success", Euromoney, pp. 1–8, Jun. 1988.

Thorton, Emily, Going Belly–Up in Japan; Business Week, p. 54, May 1997.

"Anacomp Announces Loan Processing System," The Magazine of Bank Management (formerly Bank Administration Magazine), Aug., 1996, p. 60.

"Bye–bye Paper," ABA Banking Journal, Apr., 1990, p. 95.

Campbell, M., "Computer Help for Insurance Agencies," PC Magazine, v3, N25, pp. 301–303.

U.S. application No. 07/752,026, Lockwood, filed Aug. 29, 1991.

U.S. application No. 07/850,028, Keen et al., filed Mar. 12, 1992.

Dixon, Lang, "Automation at the Point of Sale (insurance agents)," Best's Review–Life Health Insurance Edition, v84, p. 62(2), May, 1983.

"Instant Loan Approval System Now Available to Small and Mid–Sized Financial Institutions" AMS (American Management Systems Incorporated) News Release, Oct. 13, 1998.

Lawrence, J., "Untangling Neural Nets (When One Model is Better Than Another?)," Online Version, Apr., 1990.

"Malone Introduces Innovative Banking Services," PR Newswire; 0608DV004; Jun. 1989.

"MortgageWare Resource Guide," Interlinq Software Corp.

"New Paradigms in Retail Banking: The RDS Report on the Future of Retail Banking Delivery," BAI, 1995.

"New Ways to Automate Auto Loan Process," American Banker–Bond Buyer a Division of Thomson Publishing Corporation, Automation Ideas; vol. 5, No. 30, p. 3.

Radding, Alan, "A View of Technology in '92," Bank Management, vol. 68, No. 1, pp. 28–35.

Read, Richard, "Crossing the Track to Success," Euromoney, pp. 1–8, Jun. 1988.

Rich, Jason R., "Software" (for loan processing) (column), Mortgage Banking Aug. 1990, vol. 50, No. 11, p. 67(3).

Servantis Systems, Inc., "PEP+ (Paperless Processing Plus)," DIALOG® File 256 (01513881), Jan. 1986.

Sichelman, Lew, "The Instant Mortgage," United States Banker, Feb. 1988, National Edition.

Sklenar, Robert R., "A Cafeteria of Services (insurance agency automation)," Best's Review—Property/Casualty Insurance Edition, vol. 85, No. 1, pp. 64–66, 116, May 1984.

Smith, Anne Kates, "The Computer Liked Us," US News and World Report, vol. 199, No. 7, pp. 71–72, Aug. 14, 1995.

"Software Package Aids Mortgage Management," ABA Banking Journal, Oct., 1983, p. 140.

Tauhert, Christy, "Commerce Branches Off Into PC Banking," Bank Systems & Technology, May 1996.

Tyson, David O., "Interlinq Mortgage Software Hits Big Time With Prudential Real Estate Subsidiary Deal," American Banker, Nov. 1987.

"University Support Services Announces State–of–the–Art Loan and Processing Service for Education Borrowers," PR Newswire, Jul. 15, 1993.

Janet L. Fix, "Shopping List: Car Loan, canned corn", USA Today, Jul. 20, 1994, p. 68.

Kathleen Day, "Cutting Corners at the Kiosk: New Services Widen Use of Electrical Devices", The Washington Post, Jul. 22, 1994, p. A1.

William McCall, "People interface with banks from home", The Associated Press, Aug. 5, 1994.

"Neural Networks: A Logical progression in credit and marketing decision systems", Credit World, Mar./Apr. 1993, pp. 26–33, Alan Jost.

"Stocking Up At The ATMs: Citibank Machines to Allow Customers to Trade Shares", The Washington Post, Oct. 6, 1994, p. D11, Sandra Sugawarn.

"Delivery Debate", Roundtable, May 1994, p. 20, Susan Sandler, ed. New Paradigms In Retail Banking: The RDS Report on the future of Retail Banking Delivery, BAI, 1994.

AUTOMATIC FINANCIAL ACCOUNT PROCESSING SYSTEM

This is a continuation application claiming the benefit of Ser. No. 08/732,584, filed Oct. 15, 1996, pending, entitled AN AUTOMATIC FINANCIAL ACCOUNT PROCESSING SYSTEM in the name of Jeffrey Norris, which in turn is a File Wrapper Continuation of Ser. No. 08/327,653, filed Oct. 24, 1994, abandoned, which in turn was a Continuation-In-Part Application of Ser. No. 08/113,205, filed Aug. 27, 1993.

BACKGROUND OF THE INVENTION

1. Field of the Invention

The present invention relates generally to closed loop financial transactions. More specifically, the present invention is a method and apparatus for processing financial transactions automatically, including loans, applications for credit, establishment of accounts and other transactions that typically take place at banks.

2. Discussion of Background

Currently, consumers go to banks, credit unions and other types of financial institutions for a wide variety of services. At these institutions, one can deposit and withdraw money, transfer funds from one account to another, establish checking and savings accounts, arrange for automatic deposits to and withdrawals from accounts, apply for credit and debit cards, establish and fund individual retirement accounts, purchase certificates of deposit and savings bonds, obtain cashier's checks, and order checks for checking accounts. Although the numbers and types of financial institutions have proliferated, going to these during normal working hours is still a chore.

For years, night deposit boxes have made it possible for businesses and individuals to deposit money in a bank after hours. The advent of automatic teller machines make some of these financial services, particularly withdrawal of funds from checking accounts and the obtaining of cash advances against a credit card limit, possible both during the day and after normal banking hours. Of course, many financial transactions can still be handled through the mail. Nonetheless, there remains a significant number of services that can only be provided to a consumer if he or she is willing and able to go to a financial institution to get them.

An example of one such service is borrowing money. Borrowed money is essential to facilitate commerce and personal finance. Individuals and businesses borrow money on both a short term and a long term basis for better management of their day-to-day financial transactions and to obtain the goods and services they need when they need them. If the need to borrow money is anticipated, the arrangements for borrowing can be made in advance of the need. But financial needs are sometimes not foreseen, and the extent of a financial need is not always known or knowable in advance. Furthermore, these arrangements are usually somewhat of a necessary inconvenience because they take time and effort to complete.

When an individual needs to borrow money, the lender will not only expect repayment, but will also want to have confidence that the amount lent can be repaid on time. The effort by the borrower to provide the lender with this confidence level will depend on the amount lent. For example, a loan of less than one hundred dollars might be made simply on the basis of knowing that the individual to whom the money is lent has a job. For lending millions of dollars, the lender may want to take a security interest in assets that have a value in excess of the amount lent, to cover fluctuations in the values of those assets during the time the loan is being repaid.

Not only will the borrower have an obligation to convince the lender that the borrower is creditworthy, the lender also has obligations to the borrower. For example, in consumer loans, laws require the lender to carefully explain certain aspects of the terms of the loan, and, if the borrower's application for the loan is turned down, the reasons why.

When time and foresight permit advance arrangement of loans, the act of borrowing can be made much simpler. When time is short and the need for the loan was not anticipated, the act of going through the process of borrowing may be so time-consuming that obtaining the loan may not be possible at all.

Typically, a business and an individual will either borrow relatively small amounts using credit cards, with preapproved credit limits or go to a lending institution for larger sums, where the process of completing documentation for borrowing money takes longer and is subject to conditions that must be fulfilled before the loan can be made. Naturally, for large loans the safeguards for the lender take time. But for smaller loans, those above credit-card limits but still below a level where there might be a significant concern of the ability of the lender to repay the loan, there exists a need for greater convenience.

Other services offered by banks, such as applying for credit cards, are similar to borrowing money insofar as applications must be completed and processed for approval. Others are essentially administrative, such as opening a checking or savings account, obtaining additional checks and obtaining a debit card. All such services must be obtained by going to a bank and completing the necessary documentation, with the attendant inconvenience.

SUMMARY OF THE INVENTION

According to its major aspects and briefly stated, the present invention is a method and apparatus for closed loop processing of financial transactions such as, especially, a loan or credit card application, including completion of the application, underwriting, and transferring of funds. The term "closed loop" means that all the steps involved are performed by a computer that is programmed to make the decision to approve or disapprove the request and to complete all aspects of it, including complying with regulatory requirements, on behalf of the financial institution within minutes of the time the consumer initiates the request for the particular service. In loan application processing, for example, the closed loop includes the steps of transferring the funds to the borrower and arranging for repayment, as well as completing the loan application and underwriting it, including execution of regulatory requirements related to consumer financing, all done without human intervention. In the primary examples presented in the present invention, for loans and credit cards, the apparatus uses a computer controller and a telecommunications link, plus other electronic communications equipment, to enable the complete, automated processing of the application; namely: (1) the exchange of information with the applicant, preferably using "touch-screen" or voice recognition technology; (2) the underwriting, which means the evaluation and, importantly, approval of the application, plus, most importantly; (3) immediately transferring electronically the funds from a source of funds to the deposit account designated by the applicant; (4) completing of consumer financing regulatory requirements; and, optionally, (5) automatic withdrawals from the applicant's account to repay the loan.

With respect to financial transactions generally, the present invention is the closed loop performance of financial functions via a computer and monitor mounted in a kiosk, located in convenient places and using "touch-screen" or voice recognition technology, for the consumer to indicate choices and provide information, and an electronic signature pad to obtain the signature of the applicant indicating understanding and acceptance of the terms of the transaction.

In the example of a loan or credit card, an applicant applies via a variety of communication and electronic routes to make contact with the computer, which responds to the applicant and obtains information using touch-screen technology, in which the consumer applicant indicates a choice or supplies information by touching a computer monitor at the locations provided, or voice recognition technology, where the consumer simply states a choice or other appropriate response recognizable to the computer controller. In the case of a touch screen monitor, the computer controller can sense touching of the screen electronically and determines the location touched. Information about the applicant is also obtained via electronic transfer of data to the computer from one or more databases, including those that provide name and address based on a caller's telephone number, and from credit bureaus that provide credit reports on an applicant given an applicant's name, a social security number and an address.

In a preferred embodiment, the computer capability of the present invention also contains evaluation criteria in the form of underwriting models, that are used to "score" the application; that is, to make a determination of whether to approve the application based on a computer analysis of factors deemed important in assessing the would-be borrower's ability and willingness to repay the loan and to quantify the risk of its not being paid.

Finally, the loan agreement and other documentation, important for assuring that regulatory requirements have been met, are signed by the consumer using the electronic signature pad, and copies of the agreements with the electronic signature set in place are printed out for the consumer. The processing of the application is done completely and automatically, without human intervention.

In a preferred embodiment, the user-interface is a kiosk housing a computer controller, at least one telecommunications link, a monitor or "touch-screen" monitor, a camera to make a digital photograph of the applicant, a bank card reader to identify an applicant and activate the computer controller, and means for electronically transferring the signature and a photograph of the borrower onto the loan or credit card agreement. The kiosk may be established at a convenient location, such as an airport terminal, a bank, a shopping area or a store selling goods that might carry a price higher than a typical credit card limit, such as a jewelry store or computer sales store, for example. The kiosk can enable the consumer to establish checking and savings accounts, apply for and be immediately issued or sent credit and debit cards, establish and fund individual retirement accounts, obtain savings bonds and certificates of deposit, arrange for automatic deposits to and withdrawals from accounts, obtain cashier's checks, and order checks for checking accounts.

An important feature of the present invention is the extent to which the financial transactions are processed by the computer controller and without human intervention. Computers are used to assist in processing applications routinely, but the extent of use here significantly exceeds that known in the art. Here, the processing by computer controller includes underwriting the application and deciding to make or deny the loan (or delay loan approval until more information is provided) or credit, and the issuance of funds in the form of an electronic fund transfer from a source of funds controlled by the computer controller or printing of a check by the printer housed in the kiosk, or issuance of a transaction card, such as a credit, debit or "smart" card, imprinted with the necessary information. The use of the computer to access certain information not within its own memory via telecommunications link also eliminates the need for human-based processing. Avoiding human intervention not only saves processing time and reduces errors, but also eliminates bias in the decision to approve or deny the application.

The use of a kiosk to make available to borrowers the communications capability for applying for a loan or credit card is another important feature of the present invention. Kiosks, placed in convenient locations, will contain electronic equipment that facilitates and speeds all of the steps of the application. Importantly, because funds are deposited directly into the borrower's bank account rather than dispersed directly to the borrower from an automatic teller machine, the obtaining of funds from such a kiosk is safer than obtaining funds from a teller machine.

Yet another feature of the present invention is the use of an electronic signature pad to obtain signatures of consumers for applications, for signature specimens, for indicating an understanding of regulatorily-required disclosures, and for consent to the various financial services provided. Because signatures can be obtained and recorded electronically, there is no need for the consumer to interact with a financial representative handling paper documents, and, therefore, financial transactions can be done at any time of the day. Documents that are to be given to the consumer can be printed out by the printer carried by the kiosk. In fact, the present invention greatly reduces the need for financial institutions to maintain offices and makes it more cost effective for them to provide kiosks in remote areas rather than branch offices.

Yet another feature of the present invention is the inclusion of a camera to make a digital photograph of the user for placing the photograph on checks, credit cards and loan documents, to prevent fraud and deter theft.

The use of "touch screen" technology, another feature of the present invention, makes it easier, quicker and more reliable for the consumer to indicate a selection.

Other features and advantages will be apparent to those skilled in the art of automatic financial transactions from a careful reading of the Detailed Description of Preferred Embodiments accompanied by the Drawings.

DETAILED DESCRIPTION OF PREFERRED EMBODIMENTS

The present invention is a method and apparatus for providing closed loop financial services. In a preferred embodiment, these services include those identified in FIG. 1: specifically, making loans, issuing checks (such as cashiers' checks) certificates of deposit, treasury bills, mutual fund shares, issuing transaction cards, such as credit/debit cards and so-called "smart" cards, and establishing new accounts and depositing funds. The particular examples of loans and credit cards will be described in detail. However, the other services, as will be described presently, can also be obtained in accordance with a preferred embodiment of the present invention.

The present invention includes making a loan or obtaining a transaction card automatically, that is, a closed loop financial transaction. By the term "automatically," it is meant that an application is received and processed, the decision to grant the loan or to issue the credit card, and the deposit of the loaned amount to the borrower's account, is made entirely by computers in conjunction with voice and electronic communication equipment. Similarly, in the case of other financial transactions, "automatically" also means each step is handled by the computer controller without human intervention, assistance or decision-making.

The term "required documentation" or "documentation required by regulation" refers to documents required by the lender as part of good financial institutional practice for meeting internal requirements and regulatory requirements. With regard to regulatory requirements in particular, the regulations are Federal Reserve Board Regulations B (12 CFR 202 et seq.) and Z (12 CFR 225 et seq) promulgated pursuant to Title I of the Consumer Credit Protection Act (15 USC 1640 et seq.) and the Federal Truth In Lending Act (15 USC 1601 et seq.), respectively. These regulations prescribe the information to be given to a borrower or potential borrower regarding the terms of the transaction and reasons for denial of credit. Financial institutions usually comply with these regulatory requirements by providing the information to consumers in writing and obtaining the consumer's signature that the information was in fact provided and understood.

"Transaction cards," used in the context of financial transactions, refer to credit, debit, "smart", merchant, or credit identification cards containing information encoded in some way on the card, such as magnetically.

Figure 1:
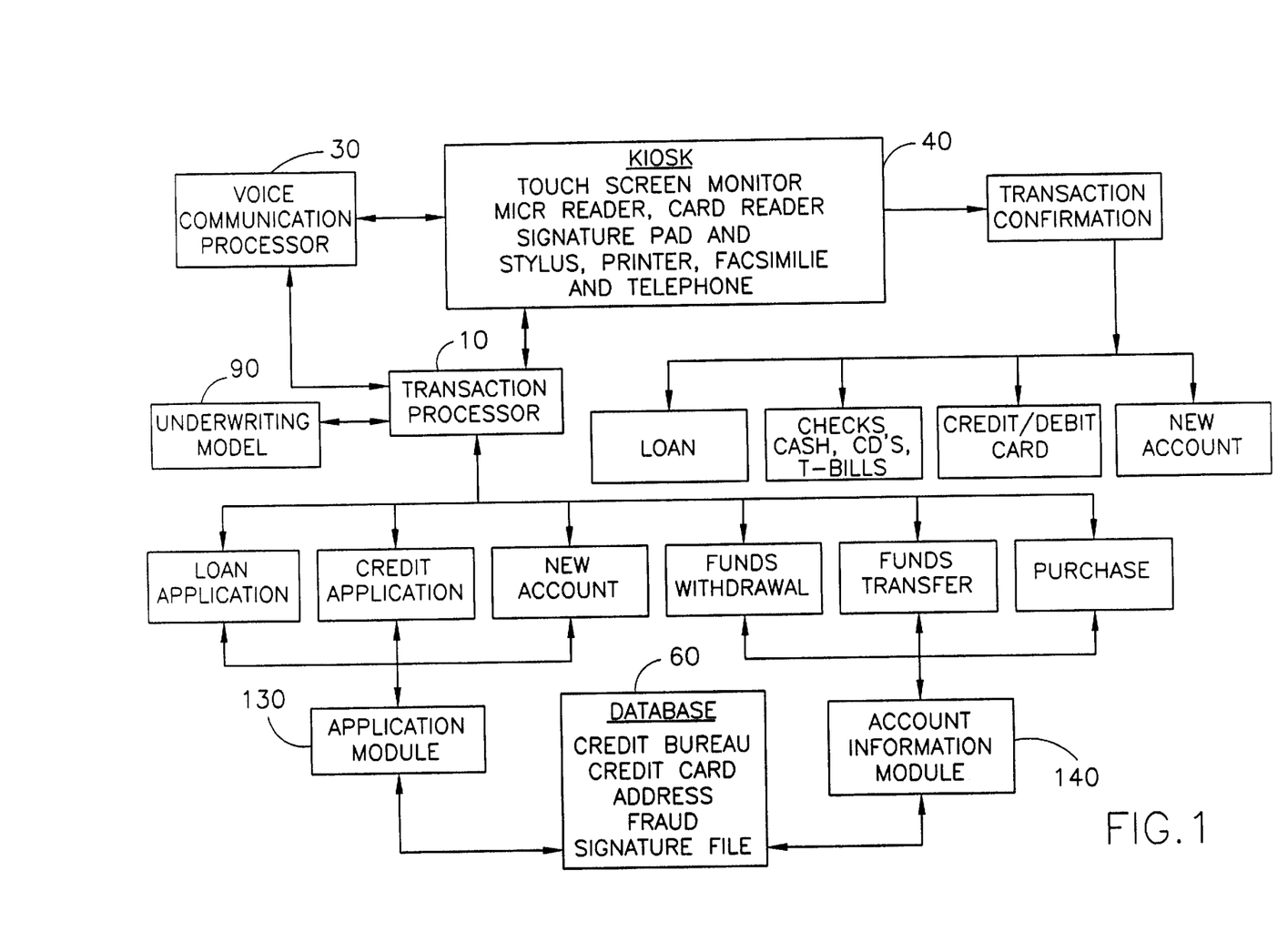
FIG. 1 is a flow chart illustrating the menu of services and the major steps of an automatic financial lending system according to a preferred embodiment of the present invention.

FIG. 1 shows a flow diagram according to a preferred embodiment of the present invention. The user (sometimes referred to herein generally as "consumer" or "applicant" or "borrower" in the case of loan applications) accesses the system by approaching a kiosk 40 (see FIGS. 2 and 3) that has either voice recognition capability through a voice communication processor 30 or a monitor 50 with touch screen capability. Touch screen capability in monitors is well known. To indicate a choice presented by a computer monitor having touch screen capability, the user simply touches the screen at the location indicated. For example, images of a "yes" and a "no" button will appear and, by touching the "yes" button, the consumer indicates an affirmative answer to the question presented.

Use of voice communication processor 30 requires the consumer to state aloud a choice rather than point to one on monitor 50. This technology is obviously more sophisticated than touch screen technology but is also well known in several other applications.

Touch screen monitor 50 or voice communication processor 30 enables the consumer to "talk" to the transaction processor 10. By so communicating, information can be exchanged and the particular types of transactions selected by the consumer can be completed. Importantly, the consumer is interacting with transaction processor 10 without assistance from employees of the financial institution. Interacting with a transaction processor can be viewed as impersonal, but it can also be viewed as more private and freer of bias.

Kiosk 40 is activated by drawing an ATM or bank card or equivalent through a magnetically encoded card reader 70 or by providing a member number for credit unions or a merchant number for merchants and finance companies. The information encoded in the magnetic stripe on the back of the card is read by reader 70 and the information passed to transaction processor 10.

In a preferred embodiment, transaction processor 10 inquires of the consumer as to the type of transaction desired and selects the corresponding application or account information module, 130, 140, respectively, that then assists its informational gathering activities. If the consumer wishes to apply for a loan, credit or to set up a new account, application module 130 is activated to obtain the requisite information from the consumer and comply with lending institution and regulatory requirements associated with the particular application If the consumer desires to withdraw or transfer funds or to make a purchase or a deposit, transaction processor 10 will activate account information module 140 to move funds from an account or from one source of funds to another account or will issue a check from kiosk 40 to the merchant or directly to the consumer.

In either case, information must be exchanged with the user. This information comes in part from the consumer's physically indicated or spoken responses to inquiries and in part from a database 60 using the borrower's telephone number for identification. Transaction processor 10 determines caller's name and address from database 60 based on the telephone number of the consumer or, in a preferred embodiment, from information encoded magnetically on a bankcard used by the consumer to activate kiosk 40. Other than confirmation that the consumer wants to apply for a loan (or, alternatively, to initiate one of the other transactions possible), the amount desired, and the term, transaction processor 10 initially needs only the applicant's name, address and social security number for identification. This information is used to obtain a credit report from a credit bureau.

The applicant's credit report is obtained from the credit bureau by transaction processor 10, evaluated using an underwriting model 90, to be described more fully below, and a decision is made based on the results of the evaluation by underwriting model 90, which results are in the form of a score and an associated risk factor, to grant or deny the loan or credit card application. Transaction processor 10 informs the borrower of the decision and, if the application is granted, presents the terms of the financial transaction to the applicant via monitor 50. If the borrower accepts the terms of the loan or credit card, the borrower can sign the documents electronically using an electronic signature pad 100 on kiosk. The same approach can be used to verify in writing the fact that the borrower understood the terms of the loan or credit card, as required by law, or, if the loan or credit card is denied, that the borrower received a copy of the negative determination letter with its explanation as to why the application was denied. In each case the consumer's signature on the documentation can be secured electronically.

When transaction processor 10 has received the credit report, it sends the report electronically to underwriting model 90 (which could be interfaced with a "neural network," a type of computer program that adapts an underwriting model to lending experience) to begin the evaluation of the application. The evaluation may proceed by iterating among a set of criteria, that are weighted. In the present application, one criterion that may be used in deciding to approve the application is that the applicant have a full time job; this criterion may in fact have the greatest weight. However, if the borrower owns a home and has several bank accounts, criteria directed toward these assets might outweigh the lack of a job.

Analyzing the loan or credit card application involves determining a score on which granting or denying the loan or credit card will be based. A typical scoring system simply assigns points to various factors that may be considered in the loan or credit granting determination. Preferably, however, an underwriting model is used for scoring the application or at least for updating on a periodic basis the points applied by a more traditional scoring system.

Underwriting model 90 is established by first identifying criteria that might have a bearing on the ability and willingness of the borrower to repay the loan or credit card. Then historical data is gathered to determine the influence, or weight, to be given to each criterion. The data is examined and the initial set of weighting factors are applied to develop estimates of the actual outcome of the data. The model's estimates are compared to the actual outcome, and the weights are adjusted to make the estimates closer until the outcome predictions have been optimized. Underwriting model 90 uses information calculated from the credit report, such as the ratio of debt to liquidity. An underwriting model designer will also make a judgment on how few criteria are needed to make a sufficiently accurate prediction. There are commercially available computer programs, known to those skilled in the art of computer decision making, that can be used to develop underwriting models for the lending model upon entering the criteria and initial weighting factors.

If the analysis of underwriting model 90 determines that the loan should be made or the credit card issued, additional information is confirmed by transaction processor 10 from data obtained from database 60 or a credit bureau or is obtained from the borrower using transaction processor 10, namely, the borrower's deposit account number, the caller's facsimile number, and the caller's acceptance of automatic withdrawal. Then, the terms and conditions of the loan or credit card must be established in writing and the borrower's signature obtained. Obtaining the signature of the borrower can be accomplished using an inkless electronic signature pad 100 and electronic pen 105 that, when the borrower makes a signature while holding pen 105, recreates, through digital technology, the signature of the borrower on the signature line of the documents displayed on the personal computer monitor.

Figure 3:
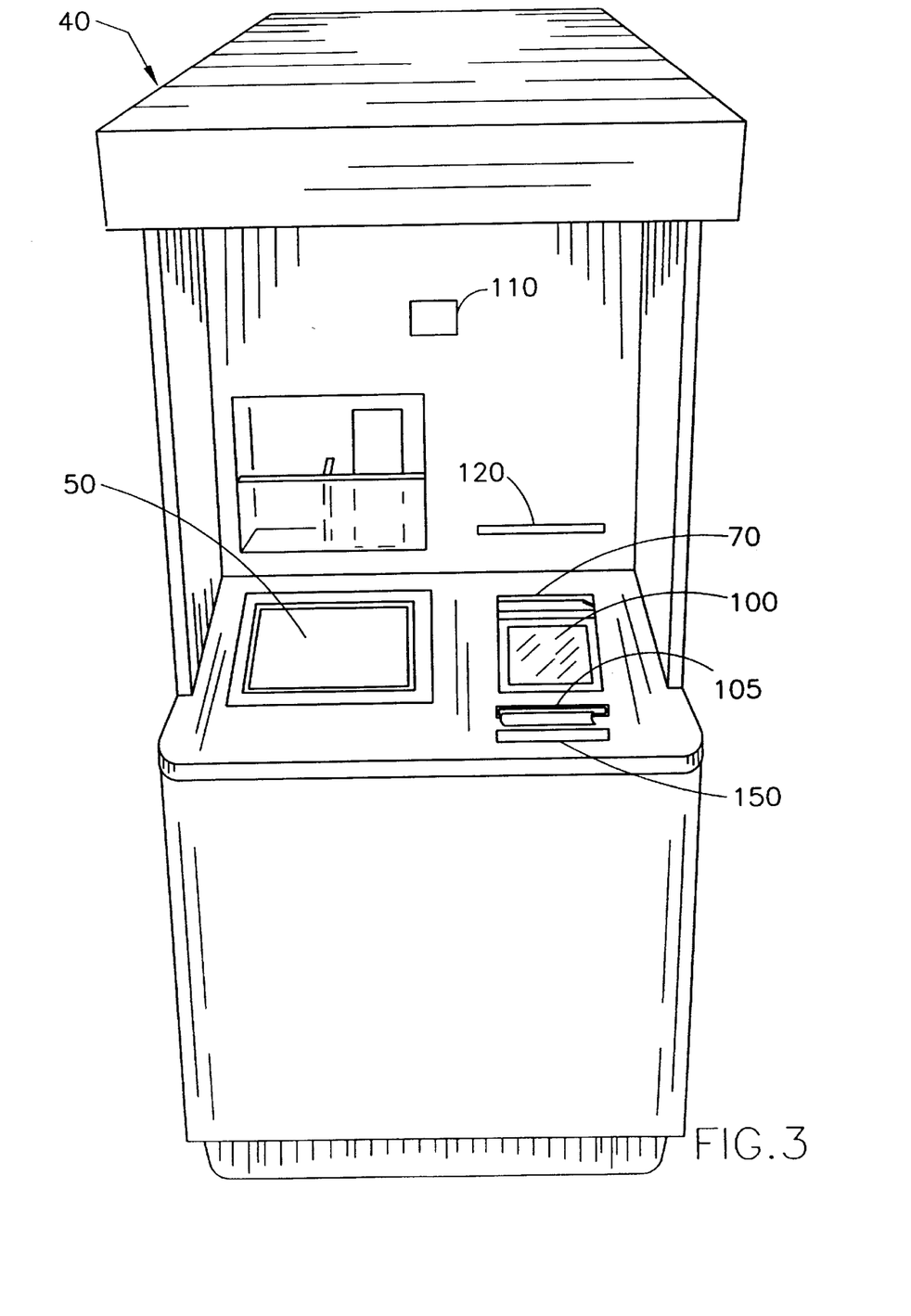
FIG. 3 is an enlarged view of the kiosk of FIG. 2 according to a preferred embodiment of the present invention.

A camera 110 carried by kiosk 40 can be used to take a photograph of the applicant digitally. A digitally generated photograph of the applicant can be placed on documents near the signature location. The signed documentation is printed using a facsimile or a laser printer (not shown) in kiosk 40. The documentation may include a copy of the digitally-generated photograph next to the signature and is issued through a printer port 120.

Transaction processor 10 then issues an electronic instruction to a source of funds such as lending institution (not shown) to transfer electronically the borrowed amount to the borrower's bank account at a deposit institution (not shown). Before the application is approved, however, there are several checks made by transaction processor 10 to prevent fraud. For example, the name of the applicant and the applicant's signature is verified, both electronically. Information obtained from the applicant including date of birth and the number of years with present employer, is compared to that available from a credit report or other sources such as the national death and birth records, drivers' licenses, criminal records, etc.

In a preferred embodiment, part of the terms of the lending agreement include permission from the borrower for the lender to make an automatic, periodic withdrawal from the borrower's bank account for repaying the loan. The automatic direct deposit by electronic fund transfer to and the automatic withdrawal of payment from the borrower's deposit account are especially important features of the present invention because they eliminate portions of the process from human control and delays. Also, if the borrower has an immediate need for the loan, direct deposit will make these funds available as quickly as possible, avoiding delays resulting from mailing, lost checks, the time taken for a check to clear, and the need to go to the deposit institution to make the deposit. Any documentation requiring the borrower's signature, including consumer lending disclosure information, will be handled as discussed previously.

No human needs to intercede. Transaction processor 10 communicates with the borrower to extract information from data base 60 and a credit bureau; underwriting model 90 makes the decision to lend, and transaction processor 10 obtains the signature of the borrower on the lending agreement using signature pad 100. Processor 10 effects the electronic fund transfer and arranges for automatic withdrawal of monthly payments. Throughout the process, transaction processor 10 will interact with the borrower using monitor 50 of kiosk 40 to prompt the borrower, who can indicate on the touch screen responses to processor 10 for the latter to obtain the credit report and process the application. Loan or credit documentation can be stored electronically by processor 10 in kiosk 40, or be transmitted by modem (not shown) within kiosk 40 and connected electronically to transaction processor 10, printed using an internal printer, and the copies of the forms issued through printer port 120.

As an example of the prompting that can be done, transaction processor can ask: "Are you currently employed? Press 'yes' or 'no.'", "How much is your monthly income?", or "How much do you spend per month?" This information, provided by way of example, would be available from a credit report, but can be confirmed by prompting a response. Alternatively, if the information is asked and the responses, based on a partial analysis, indicate that the loan cannot be made or credit not extended, the applicant can be so informed by printing a regulatory-compliant credit denial letter, and the time, need and cost of obtaining a credit report can be avoided. The answers to the prompts can be input by the borrower by using "touch screen" monitor 50 in kiosk 40.

After approving the loan or credit card application, transaction processor 10 will review with the borrower the information relevant to the loan or issuance of a credit card, such as the account number to which the direct deposit will be made and the name of the deposit institution, the account number and name of the automatic withdrawal institution, the date of the month and the first month the automatic withdrawal will begin, the address and payee if the check is not intended for deposit into an account, late charges that could apply, the finance charge, the annual percentage rate, the total cost of all the payments, and the total amount financed. This information needed from the borrower regarding his or her accounts can be obtained by transaction processor 10 after underwriting model has made the determination to make the loan or issue the credit card.

Figure 2:
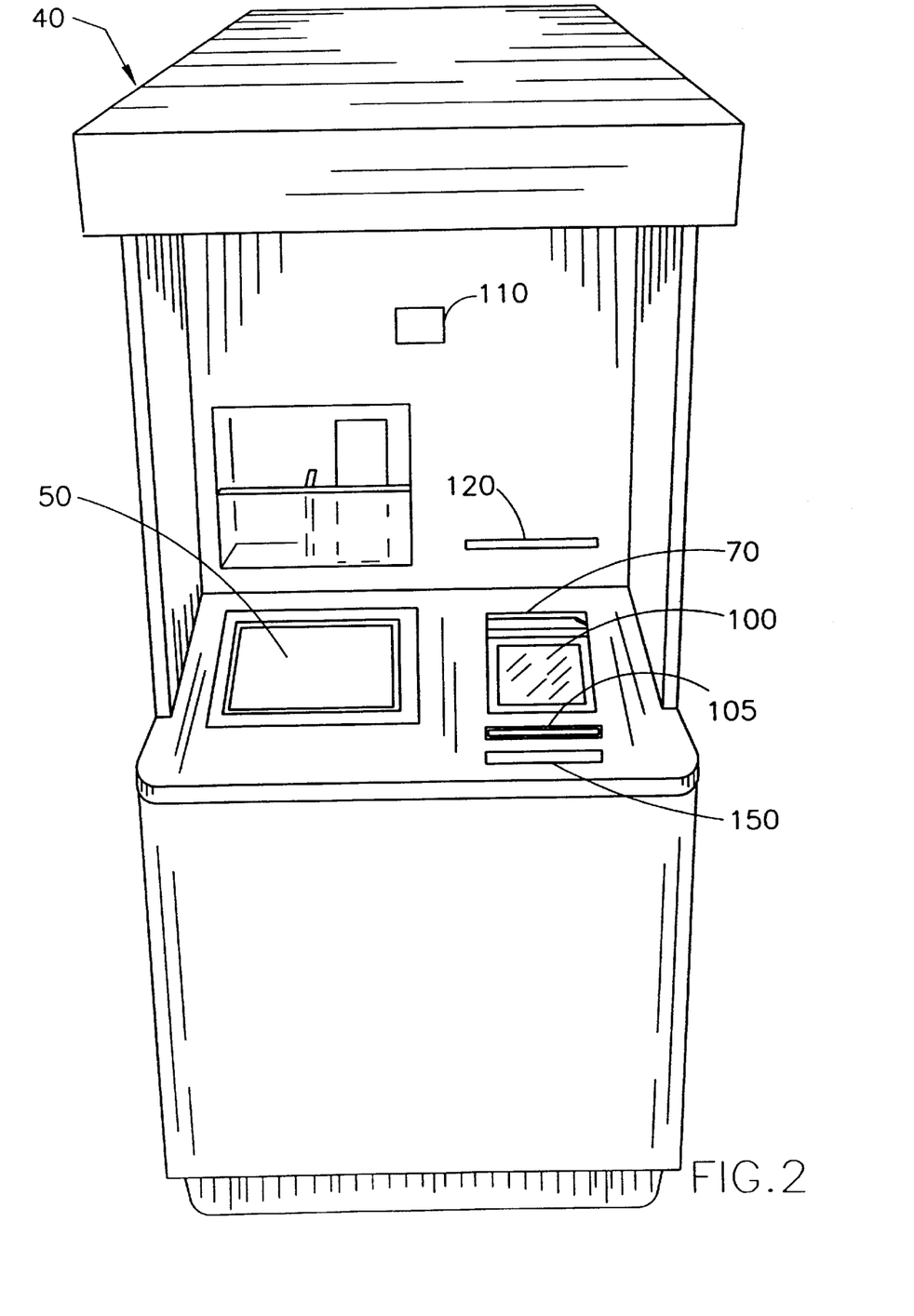
FIG. 2 is a perspective view of the front of a kiosk according to a preferred embodiment of the present invention.

The preferred embodiment for enabling a borrower to complete a loan or credit card application is housed in kiosk 40. FIGS. 2 and 3 depict kiosk 40 for use by an applicant in initiating an application. A kiosk is basically a housing that can contain all of the equipment for a borrower to use in contacting and communicating with a remote, centrally located transaction processor 10, or, alternatively, kiosk 40 can contain processor 10. Kiosk 40 includes monitor 50 with touch screen capability, a magnetic bank card reader 70 that enables a bank card to be read to identify an applicant as well as the applicant's bank and corresponding checking account, a magnetically encrypted card reader, an internal printer with communications link (not shown in FIGS. 2 and 3) and, in a preferred embodiment, electronic signature pad 100 and associated electronic pen 105 and a security camera 110. Signature pad 100 is a surface that converts the motion of electronic pen 105 as borrower holds it and goes through the motions of making a signature to an electronic image of a signature and transfers it electronically to transaction processor 10. Camera 110 takes a digital photograph of the consumer and transmits it to transaction processor 10 for application to checks, credit or debit cards, so-called "smart" cards, and loan documents. "Smart" cards are plastic cards with magnetically encoded information about the bearer of the cards, including such information as name, address, telephone number, social security number, any pertinent medical data, next of kin, account information, and so on.

In use, an applicant will enter kiosk 40 and indicate using "touch screen" monitor 50 his interest in a loan or any of the other financial services offered. He will be prompted by transaction processor via monitor 50 to run a credit, debit, "smart", ATM or merchant card through a card reader 70 to identify himself or, alternatively, may simply enter sufficient other information to validate his identity. Transaction processor 10 will access one or more databases 60, such as a credit bureau, to obtain a credit report, to run a fraud analysis, for signature verification, or to see if the consumer has written bad checks or the card is stolen. As before, the information obtained from the applicant and from the credit report will be scored, preferably using underwriting model 90, to determine whether or not to approve the application. Whether approved or disapproved, the applicant will be so informed and the loan or credit information or, if appropriate, a loan/credit denial letter provided. The signature of the applicant can be obtained using electronic signature pad 100, and a signed copy of the agreement printed out through printer port 120 with a digitized photograph of the applicant. Meanwhile, the electronic transfer of funds will have been arranged and communicated to applicant (or to a merchant or dealer selling the item purchased with the loan) as well as obtaining the borrower's permission via a signed consent form done in similar fashion to have his deposit account automatically debited to repay the loan. All regulatory requirements will be met by presenting information to the consumer via monitor 50 and obtaining concurrence of understanding by a signature using signature pad 100.

As stated above, loans and credit cards are but one of many types of services that can be provided by a kiosk of the type described or with slight modifications. In fact, all the basic services provided by financial institutions—depositing and withdrawing money, transferring funds from one account to another, establishing checking and savings accounts, arranging for automatic deposits to and withdrawals from accounts, applying for credit/debit/smart cards, establishing and funding individual retirement accounts, purchasing certificates of deposit, savings bonds, and mutual fund shares, obtaining cashier's checks, and ordering checks for checking accounts—can be done using the kiosk and computer controller of the present invention.

For example, and referring to FIG. 3, if a consumer has a checking or savings account with a particular bank and desires a debit card, one that enables him to debit such an account for purchases or to obtain cash, he can use the features of a kiosk 40, including a transaction processor 10 (see FIG. 1) and a touch screen monitor 50, its electronic signature pad 100, credit card reader 70, document and check printer (not shown), printer port 120, and credit/debit card port 150. In a procedure somewhat similar to applying for a loan, the consumer can apply for a credit card with a credit limit or a debit card that draws on his or her account. If, instead of a loan, the applicant wants a line of credit or has an account with a bank, a credit or debit card, respectively, can be imprinted by transaction processor, including a copy of the digital photograph taken with camera 110 and issued from kiosk 40 through credit card port 150 from a supply of cards kept within kiosk 40.

In establishing a checking or savings account, the consumer can transfer funds from another account to set up the new account or feed in a check to a scanner for deposit to the new account. Identifying the signature specimen can be obtained by the signing of electronic signature pad 100. Regulatory approvals can be obtained by first displaying documents on the monitor screen, highlighting those requiring careful explanation and obtaining both the consumer's acknowledgment that they were explained and that he understood them. Copies of the documents can be printed out for the consumer to take with him by the printer carried in kiosk 40.

It will be apparent to those skilled in the art that many modifications and substitutions may be made to the foregoing preferred embodiment without departing from the spirit and scope of the present invention which is defined by the following claims.

What is claimed is:

1. An automatic account processing system for establishing a financial account without human intervention for applicants located at a remote interface, said system comprising:

a. a remote interface adapted to:
    i. allow an applicant to remotely request an account; and
    ii. receive data from an applicant;
  b. a data processing system with associated memory having establishment criteria bearing on the ability and willingness of the applicant to comply with account requirements for establishing and holding an account at a financial institution based on prescribed data obtained from the applicant and information about the applicant obtained from at least one database containing information about the applicant relevant to the ability and willingness of the applicant to comply with the account requirements;
  c. a communication network electronically coupling said data processing system to said applicant interface;
  d. without human assistance, said data processing system adapted to:
    i. receive the data from the applicant received at the remote interface;
    ii. access the at least one database for information relevant to the applicant's identity and for the information relevant to the applicant's ability and willingness to comply with the account requirements;

iii. verify the applicant's identity by comparing certain of the information received from the applicant with certain of the information received from said at least one database relevant to the applicant's identity;

iv. compare certain of the information received from the applicant and certain of the information received from said at least one database relevant to the applicant's ability and willingness to comply with the account requirements to determine in real time and without human assistance if the applicant's requested account is approved; and v. send a result to the remote applicant interface informing the applicant whether or not establishment of the requested account was approved.

2. The automatic account processing system of claim 1 wherein said data processing system is further adapted to open an account at a financial institution upon approval.

3. The automatic account processing system of claim 2 wherein said data processing system is further adapted to effect a funds transfer to the account at the financial institution.

4. The automatic account processing system of claim 3 wherein said remote interface and said data processing system cooperate to receive information from the applicant identifying a source for the funds to transfer to the account and an amount of funds to transfer.

5. The automatic account processing system of claim 3 wherein said remote interface is further configured to receive funds from the applicant and said data processing system is adapted to receive information relating to the funds received from the applicant at the remote interface and to transfer to the account an amount corresponding to the funds received from the applicant.

6. The automatic account processing system of claim 5 wherein said remote interface may include one of the group consisting of a cash acceptor, card reader, and scanner to receive the funds.

7. The automatic account processing system of claim 2 wherein said data processing system is further adapted to effect a funds transfer to the account at the financial institution from another account.

8. The automatic account processing system of claim 1 further comprising a card issuing device located at said remote interface and adapted to configure a card based on applicant and account information wherein said data processing system is further adapted to effect issuance of a transaction card associated with the account from the card issuing device after approval of the requested account.

9. The automatic account processing system of claim 1 wherein said criteria bearing on the ability and willingness of the applicant to comply with account requirements is weighted and said data processing system is further adapted to:

a. provide a score based on the comparison of certain of the information received from the applicant and certain of the information received from said at least one database relevant to the applicant's ability and willingness to comply with the account requirements, and b. determine whether or not to approve the account request based on the score.

10. The automatic account processing system of claim 1 wherein said account is one of the group consisting of a checking account, savings account, retirement account, interest bearing, non-interest bearing account, and credit account.

11. The automatic account processing system of claim 1 further comprising a printer located at the remote interface for printing checks, said data processing system further adapted to cooperate with said remote interface to effect printing a negotiable instrument associated with the account.

12. The automatic account processing system of claim 11 wherein said negotiable instrument is a blank check.

13. The automatic account processing system of claim 11 wherein said negotiable instrument is a cashier's check having select value.

14. The automatic account processing system of claim 1 further comprising a printer located at the remote interface for printing checks, said data processing system further adapted to cooperate with said remote interface to effect printing a negotiable instrument having an assigned value to be drafted from the account.

15. The automatic account processing system of claim 1 wherein said data processing system is further adapted to effect ordering negotiable instruments associated with the account.

16. The automatic account processing system of claim 1 wherein said remote interface is a public kiosk.

17. The automatic account processing system of claim 1 further comprising an electronic signature pad located at the remote interface and adapted to electronically receive the applicant's signature to indicate acceptance of a financial transaction.

18. The automatic account processing system of claim 1 wherein said remote interface includes an input device selected from the group consisting of touch screens, input keys, keypads, card reader, scanner, and signature pad.

19. An automatic credit account processing system providing real time credit account processing without human intervention for applicants located at a remote interface, said system comprising:

a. a remote applicant interface adapted to:
i. allow an applicant to remotely request a credit account; and
ii. receive data from the applicant;

b. a data processing system with associated memory having underwriting criteria bearing on the ability and willingness of an applicant to repay a credit obligation based on prescribed data obtained from the applicant and information about the applicant obtained from at least one database containing information about the applicant relevant to the ability and willingness of the applicant to repay a credit obligation;

c. a communication network electronically coupling said data processing system to said applicant interface;

d. without human assistance, said data processing system adapted to:

i. receive the data from the applicant received at the applicant interface;

ii. access the at least one database for information relevant to the applicant's identity and for information relevant to the applicant's ability and willingness to repay the credit obligation;

iii. verify the applicant's identity by comparing certain of the information received from the applicant with certain of the information received from said at least one database relevant to the applicant's identity;

iv. compare certain of the information received from the applicant and certain of the information received from said at least one database relevant to the applicant's ability and willingness to repay the credit obligation with said underwriting criteria;

v. based on the comparison of certain of the information received from the applicant and certain of the information received from said at least one database relevant to the applicant's ability and willingness to repay the credit obligation with said underwriting criteria, determine in real time and without human assistance if the applicant's requested credit account is approved; and vi. send a result to the remote applicant interface informing the applicant whether or not establishment of the requested credit account was approved.

20. The automatic credit account processing system of claim 19 wherein said data processing system is further adapted to open the credit account at a financial institution upon approval.

21. The automatic credit account processing system of claim 19 wherein said credit account is a credit card account.

22. The automatic credit account processing system of claim 19 wherein said data processing system is further adapted to provide a loan from the financial institution based on the credit account.

23. The automatic credit account processing system of claim 19 wherein said data processing system is further adapted to effect a funds transfer to an account at a financial institution from the approved credit account.

24. The automatic credit account processing system of claim 19 further comprising a card issuing device located at said remote interface and adapted to configure a credit card based on applicant and account information wherein said data processing system is further adapted to effect issuance of a credit card associated with the credit account from the card issuing device after approval of the requested credit account.

25. The automatic credit account processing system of claim 19 wherein said criteria bearing on the ability and willingness of the applicant to repay the credit obligation is weighted and said data processing system is further adapted to:

a. provide a score based on the comparison of certain of the information received from the applicant and certain of the information received from said at least one database relevant to the applicant's ability and willingness to repay the credit obligation, and b. determine whether or not to approve the account request based on the score.

26. The automatic credit account processing system of claim 19 further comprising a printer located at the remote interface for printing checks, said data processing system further adapted to cooperate with said remote interface to effect printing a negotiable instrument associated with the account.

27. The automatic credit account processing system of claim 19 wherein said negotiable instrument is a blank check.

28. The automatic credit account processing system of claim 19 wherein said negotiable instrument is a cashier's check having a select value.

29. The automatic credit account processing system of claim 19 further comprising a printer located at the remote interface for printing checks, said data processing system further adapted to cooperate with said remote interface to effect printing a negotiable instrument having an assigned value to be drafted from the account.

30. The automatic credit account processing system of claim 19 wherein said remote interface is a public kiosk.

31. The automatic credit account processing system of claim 19 further comprising an electronic signature pad located at the remote interface and adapted to electronically receive the applicant's signature to indicate acceptance of a financial transaction.

32. The automatic credit account processing system of claim 19 wherein said remote interface includes an input device selected from the group consisting of touch screens, input keys, keypads, card reader, scanner, and signature pad.

33. The automatic credit account processing system of claim 23 wherein said remote interface is further configured to receive funds from the applicant and said data processing system is adapted to receive information relating to the funds received from the applicant at the remote interface and to transfer to the credit account an amount corresponding to the funds received from the applicant.

34. The automatic credit account processing system of claim 33 wherein said remote interface may include one of the group consisting of a cash acceptor, card reader, and scanner to receive the funds.

35. An automatic account processing system for establishing a financial account and issuing a corresponding transaction card without human intervention for applicants located at a remote interface, said system comprising:

a. a remote interface adapted to:
   i. allow an applicant to remotely request establishment of an account; and
   ii. receive data from an applicant;

b. a card issuing device located at said remote interface and adapted to configure a card based on applicant and account information and eject the card to the applicant upon account approval;

c. a data processing system with associated memory having establishment criteria bearing on the ability and willingness of the applicant to comply with account requirements for establishing and holding an account at a financial institution based on prescribed data obtained from the applicant and information about the applicant obtained from at least one database containing information about the applicant relevant to the ability and willingness of the applicant to comply with the account requirements;

d. a communication network electronically coupling said data processing system to said applicant interface;

e. without human assistance, said data processing system adapted to:
   i. receive the data from the applicant received at the remote interface;
   ii. access the at least one database for information relevant to the applicant's identity and for the information relevant to the applicant's ability and willingness to comply with the account requirements;
   iii. verify the applicant's identity by comparing certain of the information received from the applicant with certain of the information received from said at least one database relevant to the applicant's identity;
   iv. compare certain of the information received from the applicant and certain of the information received from said at least one database relevant to the applicant's ability and willingness to comply with the account requirements to determine in real time and without human assistance if establishment of the applicant's requested account is approved; and
   v. effect issuance of a transaction card from the card issuing device if establishment of the requested account was approved.

36. The automatic account processing system of claim 35 wherein said criteria bearing on the ability and willingness of the applicant to comply with account requirements for establishing and holding an account at the financial institution is weighted and said data processing system is further adapted to:

a. provide a score based on the comparison of certain of the information received from the applicant and certain of the information received from said at least one database relevant to the applicant's ability and willingness to comply with account requirements for establishing and holding an account at the financial institution, and b. determine whether or not to approve the account request based on the score.

37. An automatic credit account processing system for establishing a credit account without human intervention for applicants located at a remote interface, said system comprising:

a. a remote interface adapted to:
   i. allow an applicant to remotely request establishment of an account; and
   ii. receive data from an applicant;
b. a data processing system with associated memory having establishment criteria bearing on the ability and willingness of the applicant to repay a credit obligation based on prescribed data obtained from the applicant and information about the applicant obtained from at least one database containing information about the applicant relevant to the ability and willingness of the applicant to repay a credit obligation;
c. a communication network electronically coupling said data processing system to said applicant interface;
d. without human assistance, said data processing system adapted to:
   i. receive the data from the applicant received at the remote interface;
   ii. access the at least one database for information relevant to the applicant's identity and for the information relevant to the applicant's ability and willingness to repay a credit obligation;
   iii. verify the applicant's identity by comparing certain of the information received from the applicant with certain of the information received from said at least one database relevant to the applicant's identity;
   iv. compare certain of the information received from the applicant and certain of the information received from said at least one database relevant to the applicant's ability and willingness to repay a credit obligation to determine in real time and without human assistance if establishment of the applicant's requested credit account is approved; and
   v. send a result to the remote applicant interface informing the applicant whether or not establishment of the requested credit account was approved.

38. The automatic credit account processing system of claim 37 wherein said criteria bearing on the ability and willingness of the applicant to repay a credit obligation is weighted and said data processing system is further adapted to:

a. provide a score based on the comparison of certain of the information received from the applicant and certain of the information received from said at least one database relevant to the applicant's ability and willingness to repay a credit obligation, and
b. determine whether or not to approve the account request based on the score.

39. An automatic processing system for issuing a transaction card for a given account without human intervention for applicants located at a remote interface, said system comprising:

a. a remote interface adapted to:
   i. allow an applicant to remotely request a transaction card; and
   ii. receive data from an applicant;
b. a card issuing device adapted to configure a card based on applicant and account information and eject the card to the applicant upon account approval;
c. a data processing system with associated memory having criteria bearing on the ability and willingness of the applicant to comply with requirements for obtaining a transaction card for the account at a financial institution based on prescribed data obtained from the applicant and information about the applicant obtained from at least one database containing information about the applicant relevant to the ability and willingness of the applicant to comply with the requirements;
d. a communication network electronically coupling said data processing system to said applicant interface;
e. without human assistance, said data processing system adapted to:
   i. receive the data from the applicant received at the remote interface;
   ii. access the at least one database for information relevant to the applicant's identity and for the information relevant to the applicant's ability and willingness to comply with the requirements;
   iii. verify the applicant's identity by comparing certain of the information received from the applicant with certain of the information received from said at least one database relevant to the applicant's identity;
   iv. compare certain of the information received from the applicant and certain of the information received from said at least one database relevant to the applicant's ability and willingness to comply with the requirements to determine in real time and without human assistance if the applicant's requested transaction card is approved; and
   v. effect issuance of the transaction card from the card issuing device if the requested account was approved.

40. The automatic transaction card issuing system of claim 39 wherein said criteria bearing on the ability and willingness of the applicant to comply with requirements for obtaining a transaction card for the account at a financial institution is weighted and said data processing system is further adapted to:

a. provide a score based on the comparison of certain of the information received from the applicant and certain of the information received from said at least one database relevant to the applicant's ability and willingness to comply with requirements for obtaining a transaction card for the account at a financial institution, and
b. determine whether or not to approve the transaction card request based on the score.

41. The automatic processing system of claim 40 wherein said transaction card is one of the group consisting of smart, debit, and credit cards.

42. An automatic credit account processing system providing real time credit account processing without human intervention for applicants located at a remote interface, said system comprising:

a. a remote applicant interface adapted to:
   i. allow an applicant to remotely request a credit increase for an existing account; and
   ii. receive data from the applicant;

b. a data processing system with associated memory having weighted underwriting criteria bearing on the ability and willingness of a applicant to repay a credit obligation based on prescribed data obtained from the applicant and information about the applicant obtained from at least one database containing information about the applicant relevant to the ability and willingness of the applicant to repay a credit obligation;

c. a communication network electronically coupling said data processing system to said applicant interface;

d. without human assistance, said data processing system adapted to:
  i. receive the data from the applicant received at the applicant interface
  ii. access the at least one database for information relevant to the applicant's identity and for information relevant to the applicant's ability and willingness to repay the credit obligation;
  iii. verify the applicant's identity by comparing certain of the information received from the applicant with certain of the information received from said at least one database relevant to the applicant's identity;
  iv. compare certain of the information received from the applicant and certain of the information received from said at least one database relevant to the applicant's ability and willingness to repay the credit obligation with said weighted underwriting criteria;
  v. based on the comparison of certain of the information received from the applicant and certain of the information received from said at least one database relevant to the applicant's ability and willingness to repay the credit obligation with said weighted underwriting criteria, determine in real time and without human assistance if the applicant's requested increase in credit is approved; and
  vii. send a result to the remote applicant interface informing the applicant whether or not the credit increase request was approved.

43. The automatic credit account processing system of claim 42 wherein said criteria bearing on the ability and willingness of the applicant to repay a credit obligation is weighted and said data processing system is further adapted to:
  a. provide a score based on the comparison of certain of the information received from the applicant and certain of the information received from said at least one database relevant to the applicant's ability and willingness to repay a credit obligation, and
  b. determine whether or not to approve the account request based on the score.

44. The automatic credit account processing system of claim 39 wherein said processing system is further adapted to effect an increase in credit for the existing account if the increase in credit is approved.

* * * * *

US006105007C1

(12) EX PARTE REEXAMINATION CERTIFICATE (5458th)
United States Patent
Norris (10) Number: US 6,105,007 C1
(45) Certificate Issued: *Jul. 25, 2006

(54) AUTOMATIC FINANCIAL ACCOUNT PROCESSING SYSTEM

(75) Inventor: Jeffrey A. Norris, Lexington, SC (US)

(73) Assignee: Decisioning.com, Inc., Columbia, SC (US)

Reexamination Request:
No. 90/006,983, Mar. 26, 2004

Reexamination Certificate for:
Patent No.: 6,105,007
Issued: Aug. 15, 2000
Appl. No.: 09/305,622
Filed: May 5, 1999

(*) Notice: This patent is subject to a terminal disclaimer.

Related U.S. Application Data (63) Continuation of application No. 08/732,584, filed on Oct. 15, 1996, now Pat. No. 5,940,811, and a continuation of application No. 08/327,653, filed on Oct. 24, 1994, now abandoned, and a continuation-in-part of application No. 08/113,205, filed on Aug. 27, 1993, now abandoned.

(51) Int. Cl.
*G06Q 40/00* (2006.01)

(52) U.S. Cl. .............................. 705/38; 705/35; 705/39; 705/42; 705/44

(58) Field of Classification Search .................. 705/38, 705/39, 42, 44; 235/379, 381; 379/37; 380/23; 340/152
See application file for complete search history.

(56) References Cited

U.S. PATENT DOCUMENTS

| | | | |
|---|---|---|---|
| 4,734,563 A | 3/1988 | Lloyd | 219/543 |
| 4,812,628 A | 3/1989 | Boston et al. | 235/380 |
| 5,239,432 A | 8/1993 | Kuroda | 360/107 |
| 5,239,462 A | 8/1993 | Jones | 705/38 |
| 5,259,066 A | 11/1993 | Schmidt | 395/54 |
| 5,305,434 A | 4/1994 | Ballard et al. | 395/155 |
| 5,383,113 A | 1/1995 | Kight | 705/40 |
| 5,398,300 A | 3/1995 | Levey | 395/22 |
| 5,475,403 A | 12/1995 | Havlovick | 705/33 |

(Continued)

FOREIGN PATENT DOCUMENTS

| | | |
|---|---|---|
| JP | H04-195256 | 7/1992 |
| JP | 5101250 | 4/1993 |

OTHER PUBLICATIONS

"Part III: Examination Procedures Approved Loans"; Jul. 31, 1999; pp. 1–7.*

"Truth in Lending Act"; http://www.smartagreements.com/bltopics/Bltopi41; 1999–2004; pp. 1–5.*

(Continued)

*Primary Examiner*—Ella Colbert (57) ABSTRACT

A method and apparatus for closed loop, automatic processing of typical financial transactions, including loans, setting up checking, savings and individual retirement accounts, obtaining cashier's checks, ordering additional checks, issuing credit and debit cards, wire transfering money, and so on. The transactions are provided from a kiosk and controlled by a computer controller interacting with the consumer. In the case of loans, a computer controller helps the consumer in the completion of the application, performs the underwriting, and transfers funds. The computer controller obtains the information needed to process the application, determines whether to approve the loan, effects electronic fund transfers to the applicant's deposit account and arranges for automatic withdrawals to repay the loan. The computer controller reviews documentation requirements including consumer lending and other required documentation with the consumer and obtains acknowledgement of acceptance of terms by having the consumer sign an electronic signature pad. Copies of documents with a digital photograph are printed out by a printer in the kiosk for the consumer. Finally, the kiosk has the capability of imprinting a credit or debit card in response to a consumer request.

U.S. PATENT DOCUMENTS

| | | | |
|---|---|---|---|
| 5,481,647 A | 1/1996 | Brody et al. | 395/51 |
| 5,576,951 A | 11/1996 | Lockwood | 705/27 |
| 5,583,760 A | 12/1996 | Klesse | 705/38 |
| 5,774,882 A | 6/1998 | Keen | 705/38 |
| 5,797,133 A | 8/1998 | Jones, II | 705/38 |
| 5,870,721 A | 2/1999 | Norris | 705/38 |
| 5,930,776 A | 7/1999 | Dykstra et al. | 705/38 |
| 5,940,811 A | 8/1999 | Norris | 705/38 |
| 5,870,721 C1 | 1/2003 | Norris | 705/38 |

OTHER PUBLICATIONS

"What Every Advertiser Needs to Know Aout Advertising Law!; Statutes Relating to FTC's Consumer Protection Mission"; http://www.lawpublish.com/statue; Jun. 8, 1998; pp. 1–7.*

Office of Thrift Supervision: Thrift Bulletin: Handbook: Cplpliance Activities: Subject: Equal Credit Opportunity Act: Federal Reserve Board Amends Regulation B; Dec. 29, 1989; Section 205; TB 40; pp. 1–15.*

Certified Translation of Japanese Laid–Open Patent Application No. H04–195256.

Abstract Japanese Laid–Open Patent Application No. H04–195256.

Mortgage Ware Resource Guide, Release 5.4d, INTER-LINQ Software Corporation, Nov. 1992.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–43 is confirmed.

Claim 44 is determined to be patentable as amended.

New claims 45–118 are added and determined to be patentable.

44. The automatic credit account processing system of claim [39] *42* wherein said processing system is further adapted to effect an increase in credit for the existing account if the increase in credit is approved.

*45. The automatic account processing system of claim 1, wherein said data processing system is further adapted to:*

*vi. send documentation required by regulation regarding the account to the applicant at the remote interface; and*

*vii. receive acknowledgement of the documentation required by regulation by the applicant at the remote interface.*

*46. The automatic account processing system of claim 45 wherein said data processing system sends the documentation required by regulation regarding the account to the applicant at the remote interface after said data processing system receives the data from the applicant received at the remote interface.*

*47. The automatic account processing system of claim 45 wherein said data processing system sends the documentation required by regulation regarding the account to the applicant at the remote interface before said data processing system sends a result to the remote interface informing the applicant whether or not establishment of the requested account was approved.*

*48. The automatic account processing system of claim 45 wherein the documentation required by regulation is a consumer lending law.*

*49. The automatic account processing system of claim 45 wherein the documentation required by regulation comprises terms of the account.*

*50. The automatic account processing system of claim 45 wherein the acknowledgement of the documentation required by regulation by the applicant at the remote interface is an electronic signature.*

*51. The automatic account processing system of claim 50 wherein the electronic signature is received from a signature pad.*

*52. The automatic account processing system of claim 45 wherein said data processing system is further adapted to electronically deliver the documentation required by regulation to the applicant at the remote interface.*

*53. The automatic account processing system of claim 45 wherein the remote interface is adapted to print the documentation required by regulation using an internal printer or through a printer port coupled to the remote interface.*

*54. The automatic account processing system of claim 45 wherein said data processing system will not approve the account if acknowledgement of the documentation required by regulation by the applicant at the remote interface is not received.*

*55. The automatic account processing system of claim 45 wherein said data processing system is further adapted to open the account at the financial institution upon approval and if acknowledgement of the documentation required by regulation by the applicant at the remote interface is received.*

*56. The automatic account processing system of claim 45 wherein said data processing system is further adapted to effect a funds transfer to an account at a financial institution from the approved account.*

*57. The automatic account processing system of claim 45 wherein said remote interface comprises a personal computer monitor.*

*58. The automatic credit account processing system of claim 19, wherein said data processing system is further adapted to:*

*vii. send documentation required by regulation regarding the credit account to the applicant at the remote applicant interface; and*

*viii. receive acknowledgement of the documentation required by regulation by the applicant at the remote applicant interface.*

*59. The automatic credit account processing system of claim 58 wherein said data processing system sends the documentation required by regulation regarding the credit account to the applicant at the remote applicant interface after said data processing system receives the data from the applicant received at the remote applicant interface.*

*60. The automatic credit account processing system of claim 58 wherein said data processing system sends the documentation required by regulation regarding the credit account to the applicant at the remote applicant interface before said data processing system sends a result to the remote applicant interface informing the applicant whether or not establishment of the requested credit account was approved.*

*61. The automatic credit account processing system of claim 58 wherein the documentation required by regulation is a consumer lending law.*

*62. The automatic credit account processing system of claim 58 wherein the documentation required by regulation comprises terms of the credit account.*

*63. The automatic credit account processing system of claim 58 wherein the acknowledgement of the documentation required by regulation by the applicant at the remote applicant interface is an electronic signature.*

*64. The automatic credit account processing system of claim 63 wherein the electronic signature is received from a signature pad.*

*65. The automatic credit account processing system of claim 58 wherein said data processing system is further adapted to electronically deliver the documentation required by regulation to the applicant at the remote applicant interface.*

*66. The automatic credit account processing system of claim 58 wherein the remote applicant interface is adapted to print the documentation required by regulation using an internal printer or through a printer port coupled to the remote applicant interface.*

*67. The automatic credit account processing system of claim 58 wherein said data processing system will not* approve the credit account if acknowledgement of the documentation required by regulation by the applicant at the remote applicant interface is not received.

68. The automatic credit account processing system of claim 58 wherein said data processing system is further adapted to open the credit account at the financial institution upon approval and if acknowledgement of the documentation required by regulation by the applicant at the remote applicant interface is received.

69. The automatic credit account processing system of claim 58 wherein said data processing system is further adapted to effect a funds transfer to an account at a financial institution from the approved credit account.

70. The automatic credit account processing system of claim 58 wherein said remote applicant interface comprises a personal computer monitor.

71. The automatic account processing system of claim 35, wherein said data processing system is further adapted to:
   vi. send documentation required by regulation regarding the account to the applicant at the remote interface; and
   vii. receive acknowledgement of the documentation required by regulation by the applicant at the remote interface.

72. The automatic account processing system of claim 71 wherein said data processing system sends the documentation required by regulation regarding the account to the applicant at the remote interface after said data processing system receives the data from the applicant received at the remote interface.

73. The automatic account processing system of claim 71 wherein said data processing system sends the documentation required by regulation regarding the account to the applicant at the remote interface before said data processing system sends a result to the remote interface informing the applicant whether or not establishment of the requested account was approved.

74. The automatic account processing system of claim 71 wherein the documentation required by regulation is a consumer lending law.

75. The automatic account processing system of claim 71 wherein the documentation required by regulation comprises terms of the account.

76. The automatic account processing system of claim 71 wherein the acknowledgement of the documentation required by regulation by the applicant at the remote interface is an electronic signature.

77. The automatic account processing system of claim 76 wherein the electronic signature is received from a signature pad.

78. The automatic account processing system of claim 71 wherein said data processing system is further adapted to electronically deliver the documentation required by regulation to the applicant at the remote interface.

79. The automatic account processing system of claim 71 wherein the remote interface is adapted to print the documentation required by regulation using an internal printer or through a printer port coupled to the remote interface.

80. The automatic account processing system of claim 71 wherein said data processing system will not approve the account if acknowledgement of the documentation required by regulation by the applicant at the remote interface is not received.

81. The automatic account processing system of claim 71 wherein said data processing system is further adapted to open the account at the financial institution upon approval and if acknowledgement of the documentation required by regulation by the applicant at the remote interface is received.

82. The automatic account processing system of claim 71 wherein said data processing system is further adapted to effect a funds transfer to an account at a financial institution from the approved account.

83. The automatic account processing system of claim 71 wherein said remote interface comprises a personal computer monitor.

84. The automatic credit account processing system of claim 37, wherein said data processing system is further adapted to:
   vi. send documentation required by regulation regarding the credit account to the applicant at the remote interface; and
   vii. receive acknowledgement of the documentation required by regulation by the applicant at the remote interface.

85. The automatic credit account processing system of claim 84 wherein said data processing system sends the documentation required by regulation regarding the credit account to the applicant at the remote interface after said data processing system receives the data from the applicant received at the remote interface.

86. The automatic credit account processing system of claim 84 wherein said data processing system sends the documentation required by regulation regarding the credit account to the applicant at the remote interface before said data processing system sends a result to the remote interface informing the applicant whether or not establishment of the requested credit account was approved.

87. The automatic credit account processing system of claim 84 wherein the documentation required by regulation is a consumer lending law.

88. The automatic credit account processing system of claim 84 wherein the documentation required by regulation comprises terms of the credit account.

89. The automatic credit account processing system of claim 84 wherein the acknowledgement of the documentation required by regulation by the applicant at the remote interface is an electronic signature.

90. The automatic credit account processing system of claim 89 wherein the electronic signature is received from a signature pad.

91. The automatic credit account processing system of claim 84 wherein said data processing system is further adapted to electronically deliver the documentation required by regulation to the applicant at the remote interface.

92. The automatic credit account processing system of claim 84 wherein the remote interface is adapted to print the documentation required by regulation using an internal printer or through a printer port coupled to the remote interface.

93. The automatic credit account processing system of claim 84 wherein said data processing system will not approve the credit account if acknowledgement of the documentation required by regulation by the applicant at the remote interface is not received.

94. The automatic credit account processing system of claim 84 wherein said data processing system is further adapted to open the credit account at the financial institution upon approval and if acknowledgement of the documentation required by regulation by the applicant at the remote interface is received.

95. The automatic credit account processing system of claim 84 wherein said data processing system is further adapted to effect a funds transfer to an account at a financial institution from the approved credit account.

96. The automatic credit account processing system of claim 84 wherein said remote interface comprises a personal computer monitor.

97. The automatic account processing system of claim 1 wherein said data processing system is further adapted to effect a funds transfer to an account at a financial institution from the approved account.

98. The automatic account processing system of claim 1 wherein said remote interface comprises a personal computer monitor.

99. The automatic account processing system of claim 1 wherein said data processing system is further adapted to send a copy of a negative determination letter to the remote interface if establishment of the requested account was not approved.

100. The automatic credit account processing system of claim 19 wherein said remote applicant interface comprises a personal computer monitor.

101. The automatic credit account processing system of claim 19 wherein said data processing system is further adapted to send a copy of a negative determination letter to the remote interface if establishment of the requested credit account was not approved.

102. The automatic account processing system of claim 35 wherein said data processing system is further adapted to effect a funds transfer to an account at a financial institution from the approved account.

103. The automatic account processing system of claim 35 wherein said remote interface comprises a personal computer monitor.

104. The automatic account processing system of claim 35 wherein said data processing system is further adapted to send a copy of a negative determination letter to the remote interface if establishment of the requested account was not approved.

105. The automatic account processing system of claim 37 wherein said data processing system is further adapted to effect a funds transfer to an account at a financial institution from the approved account.

106. The automatic account processing system of claim 37 wherein said remote interface comprises a personal computer monitor.

107. The automatic account processing system of claim 37 wherein said data processing system is further adapted to send a copy of a negative determination letter to the remote interface if establishment of the requested account was not approved.

108. The automatic credit account processing system of claim 37 wherein said data processing system is further adapted to open the credit account at a financial institution upon approval.

109. The automatic credit account processing system of claim 20 wherein said data processing system is further adapted to effect a funds transfer to the credit account at the financial institution from another account.

110. The automatic credit account processing system of claim 20 wherein said data processing system is further adapted to effect a funds transfer to the credit account at the financial institution.

111. The automatic credit account processing system of claim 110 wherein said remote applicant interface and said data processing system cooperate to receive information from the applicant identifying a source for the funds to transfer to the credit account and an amount of funds to transfer.

112. The automatic credit account processing system of claim 110 wherein said data processing system is further adapted to effect a funds transfer to the credit account at the financial institution from another account.

113. The automatic account processing system of claim 35 wherein said data processing system is further adapted to effect a funds transfer to the account at the financial institution.

114. The automatic account processing system of claim 113, wherein said remote interface and said data processing system cooperate to receive information from the applicant identifying a source for the funds to transfer to the account and an amount of funds to transfer.

115. The automatic account processing system of claim 113 wherein said data processing system is further adapted to effect a funds transfer to the account at the financial institution from another account.

116. The automatic credit account processing system of claim 108, wherein said data processing system is further adapted to effect a funds transfer to the credit account at the financial institution.

117. The automatic credit account processing system of claim 116, wherein said remote interface and said data processing system cooperate to receive information from the applicant identifying a source for the funds to transfer to the credit account and an amount of funds to transfer.

118. The automatic credit account processing system of claim 116, wherein said data processing system is further adapted to effect a funds transfer to the credit account at the financial institution from another account.

* * * * *